Oct. 9, 1951     G. A. CORMIER     2,570,647
POWER CYLINDER AND PISTON WITH LEAKAGE CONTROL

Filed Feb. 8, 1947     2 Sheets-Sheet 1

Inventor
Gerard A. Cormier
by Wright Brown Quinby & Ulley,
Attys

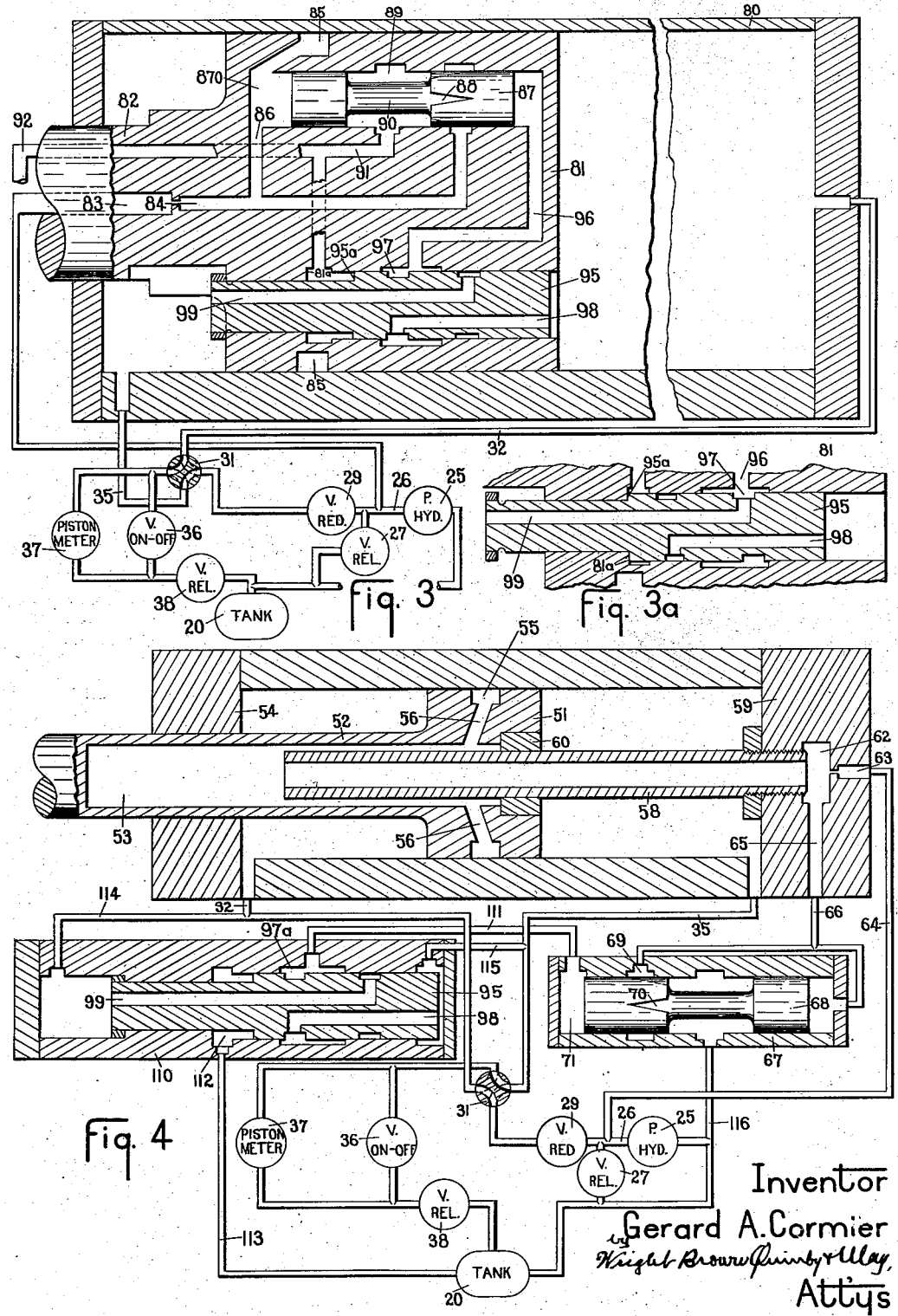

Patented Oct. 9, 1951

2,570,647

UNITED STATES PATENT OFFICE 2,570,647

POWER CYLINDER AND PISTON WITH LEAKAGE CONTROL

Gerard A. Cormier, Springfield, Vt., assignor to Jones & Lamson Machine Company, Springfield, Vt., a corporation of Vermont Application February 8, 1947, Serial No. 727,396

13 Claims. (Cl. 121—1)

This invention relates to power cylinders and pistons and has for an object to provide a construction which obviates any necessity for the use of packing rings between the piston and cylinder. Packing rings are unsatisfactory in many cases, particularly during slow relative movements between the piston and cylinder, as where the power means is used for slow feed of a machine tool, because of variable friction between the parts and variable and excessive leakage which interferes with accurate smooth control. The use of packing rings is avoided and at the same time leakage between the parts is reduced to a minimum in accordance with this invention by the employment of controlled pressure volumes. This is based on the principle that if, in place of a packing ring, a peripheral groove be provided in the piston, and the pressure fluid within the groove be maintained equal to that against one face of the piston, there will be little or no flow axially of the piston between the groove and that face. There will therefore be little or no leakage past the piston from or to this face. Also, the friction effects with such a construction are very small and are substantially constant.

As control of the rate of piston travel is more effectively done by controlling the rate of discharge of fluid from the cylinder than by controlling the rate of supply, this invention will be further described in connection with the control of the discharge rate, although the invention in its broader aspects is not limited to this particular method. In any event the leakage across the piston which is to be prevented or minimized is that from or to that side of the piston to which the flow control is connected so that the control is as much as possible unaffected by leakage. Where the discharge rate is controlled, this leakage across the piston to be prevented will therefore be that from or to the discharge end of the cylinder.

For an understanding of this invention, reference may be had to the accompanying drawings in which Figure 1 is a diagrammatic longitudinal sectional view through a hydraulic pressure cylinder and piston embodying the invention and arranged to produce a feed stroke in one direction only.

Figure 3 is a similar view of a two-way feed mechanism with the controlling valves in the piston.

Figure 3a is a view similar to a portion of Figure 3, but with the selector valve in its other position.

Figure 4 is a view similar to Figure 3, but showing a modification with the valves outside of the cylinder.

Figure 1:
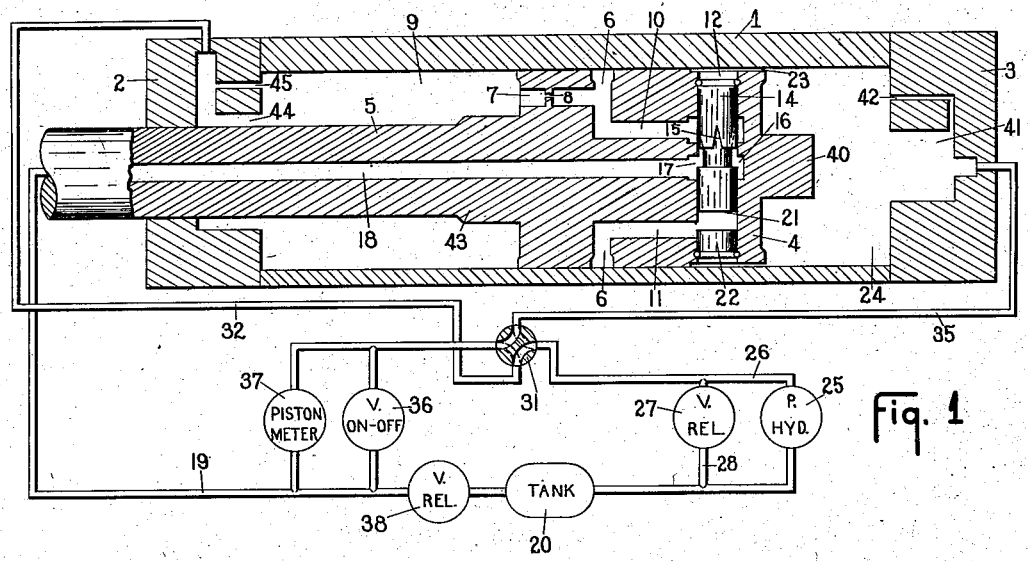

Referring first to Figure 1, there is shown diagrammatically a hydraulic cylinder 1 having heads 2 and 3. Slidable within the cylinder between these heads is a piston 4 having a piston rod 5 which extends through one of the heads, as the head 2. Between the ends of the piston 4 there is provided a peripheral recess 6 forming an annular chamber around the piston, and communicating with this recess is a passage 7 having a restriction 8 therein, this passage opening up on the left hand side of the piston 4 into the end portion 9 of the cylinder. As shown, the recess 6 is formed in the periphery of the piston. The recess 6 also communicates through a pair of passages 10 and 11 with a transverse bore 12 within which is located a variable discharge piston valve 14. This piston valve is provided with V ports 15 which register more or less with a peripheral groove 16 surrounding the piston valve 14, and into which the passage 10 opens. As the discharge valve 14 moves upwardly as shown in the drawings, the rate of discharge increases rapidly as the wider portions of the V grooves 15 come into registry with the groove 16. The grooves 15 open into a cannelure 17 of the valve, which opens into a passage 18 extending through the piston and piston rod, and leading back through a suitable pipe 19 to a liquid supply tank 20. The passage 11 leads to one end face 21 of the valve 14 between that and a closure plug 22. The other end of the valve 14 is subjected to pressure in the adjacent end of the bore 12, reaching it through a passage 23 opening into the cylinder end portion 24.

The hydraulic system, as shown, includes the tank 20 from which fluid is pumped under pressure by the pump 25 to the pressure line 26. A relief valve 27 controls the pressure in the pressure pipe 26 and discharges excess liquid through the pipe 28 back to the tank 20, or to the pump intake. In the pressure pipe 26 is a four-way control valve 31. From this control valve, fluid under pressure is directed selectively through the pipe 32 to the left hand end of the cylinder 1 into the portion 9 while discharging from the volume 24 at the right hand end of the piston through the pipe 35, or to the pipe 35 and discharging from the pipe 32, the four-way valve 31, and either directly through an on and off valve 36 to the discharge line 19, or when the valve 36 is closed, through a meter device 37 to the discharge. A pressure relief valve 38 set for much lower pressure than the valve 27 may be employed to provide a small back pressure to prevent leakage of air into the system.

The device as shown in this figure is intended for controlled feed in a right hand direction only, the motion of the piston 4 in the opposed direction being idle. At the start of the piston motion to the right, the valve 36 is open, this being for the idle fast motion to bring the tool up toward the work. Since during this portion of the stroke the discharge from the right hand end of the cylinder, or from the volume 24 is relatively free, the pressure in the volume 24 is small, consequently the piston 14 is moved upwardly by pressure from the passage 11 until such time as the discharge through the passage 10 from the peripheral recess 6 is sufficiently great to lower the pressure in this recess and in the passage 11 below that in the volume 9 to that relatively low pressure in the volume 24, at which time the pressures exerted on both ends of the valve 14 are balanced. The pressure in the volume 24 and in the annular recess 6 are thus substantially equal so that there is substantially no flow between them past the piston. When the tool is sufficiently close to the work, the valve 36 is closed, whereupon the discharge from the right hand end of the cylinder 1 has to take place through the metering device 37. This slows the discharge from volume 24 and causes the pressure in the volume 24 of the cylinder to rise, forcing the valve 14 downwardly to more or less close off the discharge past it, and causing the pressure in the peripheral recess 6 to increase because of the decreased discharge therefrom of the liquid flowing thereinto through the restricted passage 7, thus maintaining the pressure in this annular recess 6 substantially equal to that in the volume 24 so that there is substantially no leakage of fluid into or out of the chamber 24, the contents of which must all pass out through the metering valve as the piston 4 continues to move to the right. If, during the feed motion the resistance to the tool increases, tending to hold back the piston 4, the pressure in the volume 24 correspondingly reduces and the valve 14 is thus caused to move by the unbalanced pressure at its opposite ends to increase the rate of discharge from the recess 6 until the pressure in the recess 6 is again substantially the same as in the volume 24.

It will thus be seen that the hydraulic fluid trapped in the volume 24 is compelled to escape only through the metering device without being substantially effected by leakage across the piston, which is reduced to a minimum. Thus the motion of the piston 4 is controlled accurately by the action of the meter even at very low piston speeds.

As shown in Figure 1, means may be provided for cushioning the ends of the stroke in opposite directions, the means for so cushioning the stroke at the end of the feed direction comprising the cylindrical boss 40 which enters a bore 41 of the adjacent cylinder head so that discharge can take place from the volume 24 only through the restricted passage 42. At the other end of the stroke, the cushioning is produced by the entry of an enlarged diameter portion 43 of the piston rod into the small diameter bore portion 44 of the adjacent cylinder head so that discharge from the volume 9 can take place only through the small passage 45.

Figure 2:
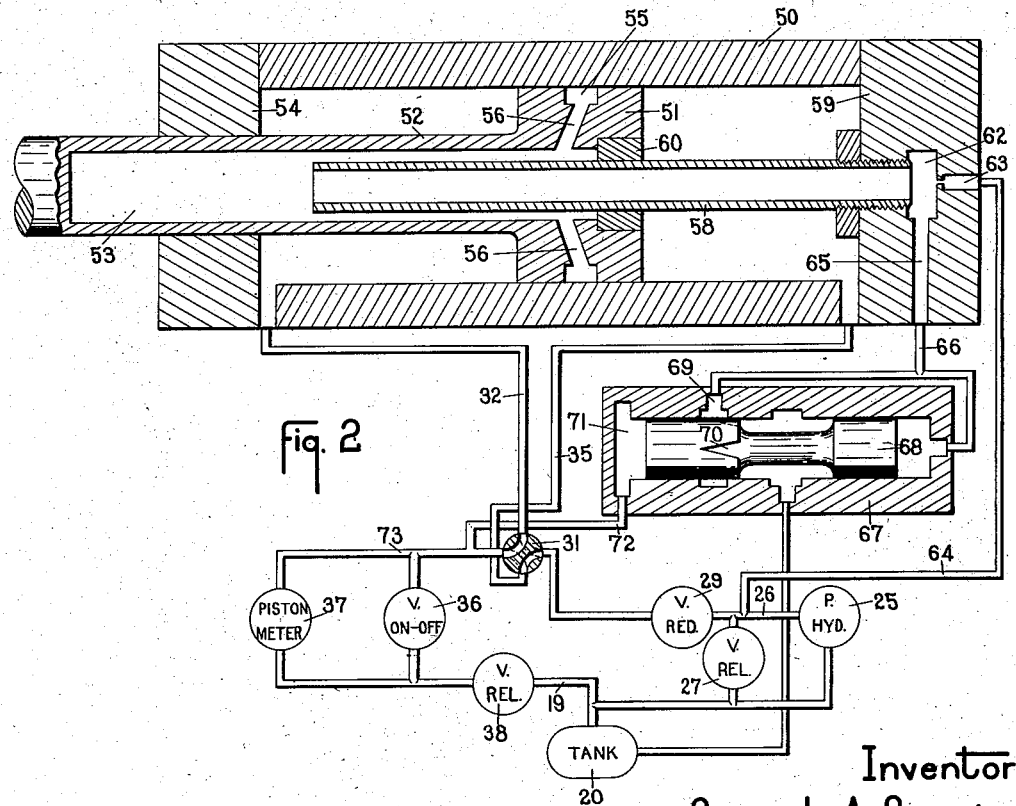
Figure 2 is a view similar to Figure 1, but illustrating a modification including hand control of a two-way feed.

In Figure 2 a construction is shown in which the feed may be made in either direction under the control of the four-way valve 31 and in which the discharge valve, which substantially equalizes pressures over a lengthwise portion of the piston, is outside of the piston and cylinder. Referring to this figure, the cylinder 50 has slidable therein the piston 51 provided with a piston rod 52 which is hollow at its inner end to form a chamber 53. This piston rod extends through the cylinder head 54. The piston 51 is provided with a peripheral recess 55 from which passages 56 lead to the chamber 53 which is partly filled by a tube 58 carried by the opposite cylinder head 59 and extending through a guide ring 60 in the outer face of the piston. The tube 58 opens into a chamber 62 in the cylinder head 59, and into this chamber 62 extends a restricted passage 63 from a pipe 64 which leads to the pressure pipe 26 between the pump 25 and a reducing valve 29. This reducing valve limits pressure in the pressure pipe leading to the four-way control valve 31 to less than that in the pipe 64.

The chamber 62 also communicates through a passage 65 and pipe 66 with a valve casing 67 at two points, one of these being beyond the right hand end of the variable discharge piston valve 68, and the other being opposite to the annular channel 69 which is more or less covered by the V ports 70 of the valve 68. The valve 68 operates similarly to the valve 14 shown in Figure 1. The left hand end of the valve 68 is subjected to pressure in a chamber 71 which communicates through a pipe 72 with a discharge pipe 73 which leads back to the tank 20 through the discharge pipe 19, either through on and off valve 36, or the metering device 37, depending upon whether idle quick motion or slow feed is desired, and, if desired, through the back pressure relief valve 38. The low pressure side of the reducing valve 29 connects through the four-way control valve 31, either into the right hand end of the cylinder through the pipe 35, or to the left hand end of the cylinder through the pipe 32, and when either of these pipes is not connected to the pressure supply, it is connected to the discharge line 73 through the four-way valve 31. As shown, for example, the pipe 35 is connected to the pressure side, while the pipe 32 is connected to the discharge pipe 73.

Assuming that the on and off valve 36 is open, the piston 51 being thus moving to the left in fast speed, the annular groove 55 of the piston is in communication with the passage 53, the tube 58 and the restricted passage 63 with the source of fluid under relatively high pressure from the high pressure side of the reducing valve 29, but at the same time the chamber 62 is in communication through the passage 65, and the pipe 66, with the right hand end of the valve 68, while the left hand end of this valve is open to the discharge pipe 73. The valve 68 is thus driven to the left to a position which opens the discharge through the ports 70 sufficiently to reduce the pressure in the pipes 66, 65, tube 58, the chamber 53, the passages 56 and the annular recess 55 to substantially the pressure within the cylinder at the left hand side of the piston, this portion of the cylinder being open to discharge through the pipe 32. If now the valve 36 be shut off, the metering device 37 comes into action to control the discharge from the left hand end of the cylinder so that the pressure within this left hand end rises and this feeds back to the left hand end of the valve casing 67, pushing the valve 68 to decrease the rate of discharge through the port 70, and allowing the pressure to build up in the pipes and passages connected thereto back into the annular recess 55 of the piston so that its pressure is substantially equalized with that to the left of the piston. Thus the speed of motion of the piston is accurately controlled by the rate of motion of the metering device, there being substantially no leakage past the piston. Should an increased resistance be encountered to the motion of the piston, the pressure in the left hand end of the cylinder correspondingly decreases, causing the discharge valve 68 to move to the left, increasing the discharge and equalizing the pressure in the annular recess 55 with that at the left of the piston.

It will be noted that a pressure-reducing valve 29 is included in the mechanism of Figure 2, while none is shown in the mechanism of Figure 1 where it is not necessary. It is employed in the mechanism of Figure 2 for the reason that when the piston 51 is moving to the left in slow feed, during which the total pressure exerted on the left hand face of the piston may be only slightly less than that on the right hand face, the unit pressure in the left hand end of the cylinder may be higher than that in the right hand end because of the smaller effective piston area of the left hand piston face due to the area occupied by the piston rod over the effective pressure area of the right hand face of the piston which is reduced by the cross sectional area of the tube 58 which is less than that of the piston rod. As the volume in the left hand end of the cylinder which is slowly diminished by the controlling action of the metering device decreases during feed speed motion of the piston in this direction of motion, leakage into or out of the left hand end of the cylinder is to be avoided. Thus the pressure in the peripheral recess 55 should be equalized with the pressure in this left hand end of the cylinder, but as this pressure may be higher than that in the right hand end of the cylinder for the reason just explained, it is derived from the pressure pipe 26 on the high pressure side of the reducing valve 29, while the fluid conducted to the right hand end of the cylinder through the pipe 35 is derived from the low pressure side of this reducing valve. This pressure reducing valve should be adjusted to give a pressure differential at least as great as any such pressure differences to be expected in opposite ends of the cylinder, and any reasonable excess of pressure difference on opposite sides of the reducing valve is taken care of automatically by the variable discharge valve 68 which is capable, when open, of discharging at a rate faster than can be supplied to the recess 55 through the restriction in its pressure supply passage.

When the piston is moving in the reverse direction, or to the right, the control valve 31 is moved to reverse the supply and discharge to opposite ends of the cylinder, as shown in dotted lines, but this does not effect the connection of the left hand end of the valve casing with the pipe 73, which is now connected through the valve 31 with the cylinder, so that equalized pressures between the recess 55 to the discharge end of the cylinder is maintained, this end now being on the right side of the piston rather than the left side by reason of the reversal of the four-way valve. While the unit pressure on the right side of the piston will not rise as high for the same operating conditions as that on the left side when the motion is to the left, the higher pressure delivered from the high pressure side of the reducing valve to the annular passage 55 will be bled off by increased opening of the valve 68 to substantially equalize it with the pressure in the right hand end of the cylinder, leakage from or to it past the piston being now to be avoided so that the rate of decrease of its volume may be accurately controlled by the metering device. Similarly, leakage between the tube 58 and the guide ring 60 is negligible, since the pressures at the opposite ends of the guide ring are substantially equalized, the inner face of the ring being subjected to pressure in the passage 53.

In Figure 3 a power cylinder construction is shown in which feed may occur in either direction, the leakage controlling mechanism being contained within the piston. Referring to this figure, the cylinder 80 contains the piston 81 provided with a piston rod 82 which extends through one end of the cylinder. Extending through this piston rod is a pressure passage 83 having the restricted orifice 84 therein, this passage 83 communicating with the recess 85 around the periphery of the piston through the passage 86. This passage 86 also communicates with one end of the valve chamber 870 in which is slidable the piston valve 87 provided with the taper ports 88 which more or less close off the connection between a portion 89 of the valve chamber 870, formed by a reduced diameter portion 90 of the valve 87, and the recess 85. The chamber 89 communicates through a passage 91 extending through the piston rod, with a pipe 92 which discharges to the supply tank 20 of the hydraulic system. This hydraulic system is the same as that shown in Figure 2, and comprises the pump 25 supplying fluid under pressure from the tank 20 to the supply pipe 26 to the high pressure side of a pressure reducing valve 29, the pressure on the high pressure side of which is controlled by the pressure relief valve 27, and at lower pressure is passed to the four-way valve 31. Pipes 32 and 35 lead from the four-way valve to opposite end portions of the cylinder 80, and the discharge from the four-way valve 31 is directed either through the on and off valve 36, or through the metering device 37, depending upon whether or not rapid or slow feed is desired. A low pressure relief valve 38 in the discharge beyond the valve 36 and the metering device 37 may be employed to produce a back pressure on the system, if desired.

The piston 81 also has mounted therein a slidable selector valve 95, which is open at opposite ends to pressures on opposite ends of the cylinder 80. Its end portions subjected to pressure are of different sizes corresponding proportionately to the effective areas on opposite faces of the piston, the effective area of the right hand face of the piston being larger than the effective area at the left hand end of the piston by reason of the cross sectional area of the piston rod 82 which subtracts from the effective area of the left hand face of the piston. The selector valve 95, is shown in Figure 3 in its right hand limit of position, in which it is placed automatically when the piston is moving in slow feed to the right by reason of the total pressure on the left hand face of the piston being slightly greater than that on the right hand face. In this position of the valve, the right hand end of the valve chamber 870 is open through the passage 96 and the cannelure 97 of the valve 95 and the passage 98 through this valve into the right hand end of the cylinder 80. Thus the pressure reaching the right hand end of the variable discharge valve 87 which opposes the high pressure from the supply acting on the left hand end of this valve is that derived from the right hand end of the cylinder 80 from which discharge is taking place through the metering device. The valve 87 thus assumes a position where the discharge through the ports 88 is just sufficient to substantially balance the pressures in the annular recess 85 and the right hand end of the cylinder 80 so that leakage across the face of the piston into or out of the discharge end of the cylinder is effectually prevented.

During feed motion of the piston to the left, the total pressure in the right hand end of the cylinder 80 acting on the piston 81 is slightly greater than that at the left hand end, although the unit pressure may be less due to the smaller effective piston area on the left hand face, this differential being also present at corresponding opposite ends of the selector valve 95, so that the selector valve is driven to the position of Figure 3a, with a shoulder 95a of the valve engaging an internal shoulder 81a of the piston, discharge from between them opening into the passage 91. In this position of the parts, a passage 99 through the valve 95, opening out at its left hand end is brought into registry with the cannelure 97 and the passage 96 while the passage 98 is moved out of registry with the cannelure 97. Thus the pressure exerted against the right hand end of the variable discharge valve 87 is now that within the left hand end of the cylinder 80 so that the pressure in the annular recess 85 is made substantially equal to that in the left hand end of the cylinder, minimizing leakage from or to the left hand end of the cylinder from which discharge is controlled by the metering device.

Similarly to the mechanism of Figure 2, the unit pressure in the left hand of the cylinder 80 and in the annular recess 85 may be higher than that in the right hand end of the cylinder even though the piston is moving toward the left, but this is provided for by reason of the reducing valve, the pressure from the low side of which is directed into the pipe 32, the four-way valve 31 then being in its dotted line position, while pressure from the high side of the reducing valve is conducted into the pressure pipe and passage 83 and finds its way to the annular recess 85.

During fast motion the valve 95 takes the same positions as previously described, the pressure differences on each end of the valve being in the same relation as in the slow feed, but with greater differences due to the low pressure on the discharge face of the piston.

In Figure 4 a construction is shown which is similar to that shown in Figure 3, except that both the selector valve and the variable discharge valve are outside of the cylinder. The cylinder, as shown, is exactly the same as that shown in Figure 2, employing the tube 58 telescopically related to the piston rod 52, and the only difference between this construction and that of Figure 2 is that it employs a selector valve 95 not present in Figure 2 and identical with that shown in Figures 3 and 3a. This selector valve 95, instead of being mounted in the piston, is mounted in a separate casing 110. The selector valve has the passages 99 and 98 opening out at opposite ends thereof, as in Figure 3, and the valve casing 110 has the internal cannelure 97a similar to the cannelure 97 in the piston of Figure 3. This cannelure 97a communicates with the left hand end portion 71 of the valve casing 67 through the pipe 111, this corresponding to the passage 96 in the piston of Figure 3.

A second cannelure 112 in the casing 110 between the shoulders 81a and 95a communicates through the pipe 113 with the supply tank 20, this pipe 113 being the equivalent of the pipe 92 of the construction shown in Figure 3. The left hand end of the casing 110 beyond the left hand end of the valve 95 communicates through a pipe 114 with the pipe 32 leading to the left hand end of the power cylinder, while the right hand of the casing 110 communicates through a pipe 115 with the pipe 35 leading to the right hand end of the power cylinder.

In the full line position of the four-way valve 31 shown in Figure 4, the piston moving to the right, pressure from the high side of the reducing valve 29 communicates through the restricted passage 63 with the interior of the tube 58 and through the chamber 53 with the annular recess 55 so that relatively high pressure is opened to this recess 55. At the same time it may discharge from the chamber 62 through the pipe 66, the cannelure 69 of the variable discharge valve casing 67, the port 70 and the discharge pipe 116, back to the tank. The rate of this discharge is determined by the relative pressures on opposite ends of the valve 68, the right hand end of which is subjected to pressure from the pipe 66, and the left hand end of which is subjected to pressure from the pipe 111 which is derived, in turn, through the passage 98 of the selector valve and the pipes 115 and 35 from the right hand end of the power cylinder. Since in this position of the valve 31, pressure from the low side of the reducing valve 29 is directed into the left hand end of the power cylinder through the pipe 32 and is also directed from this pipe 32 to the left hand end of the valve 95, while the right hand end of this valve 95 is subjected to pressure from the right hand end of the power cylinder, the feed now being to the right, the valve 95 takes the position shown, the pressure supplied through the pipe 32 being sufficiently greater than that supplied through the pipes 35 and 115, and taking into account the differential areas at the opposite ends of the valve 95, to position the selector valve in this relation identical with that shown in Figure 3. If the metering device 37 is thrown in to restrict the discharge from the right hand end of the power cylinder, the discharge pressure builds up, but this is never as high as the pressure in the left hand end of the power cylinder because the piston is now moving to the right.

If the valve 31 is turned to the dotted line position, the pressure in the right hand end of the cylinder builds up sufficiently, and the pressure in the left hand end falls sufficiently, so that motion of the piston takes place to the left. While, as before noted, the unit pressure in the left hand end of the cylinder may be greater than that in the right hand end of the cylinder by reason of the smaller piston area effective, this differential is taken care of by the differential areas in the valve 95, so that the valve 95 is moved to its left hand position similar to that shown in Figure 3a, whereupon the pressure in the annular recess 55 is controlled to be substantially the same as that in the left hand end of the cylinder so that substantially no leakage across this portion of the piston is produced, the action of the variable discharge valve 68 to establish this pressure equality being the same as in the mechanisms previously described. The valve 95 being at its left hand position similar to that shown in Figure 3a, pressure at the left hand end of the valve 95 passes through the passage 99 into the cannelure 97a and into the chamber 71 of the variable discharge valve.

From the foregoing description of certain embodiments of this invention, it will be evident to those skilled in the art that various further changes and modifications might be made without departing from the spirit or scope of this invention.

I claim:

1. In combination, a cylinder, a piston slidable in said cylinder and having a peripheral recess between its ends and having a piston rod, fluid inlet and discharge passages communicating with the interior of said cylinder beyond opposite ends of said piston, and means including a passage through said piston rod opening into said recess for establishing fluid pressure within said recess substantially equal to the fluid pressure within said cylinder beyond one end of said piston to thereby prevent substantial flow of fluid between said recess and said one cylinder end.

2. In combination, a cylinder, a piston slidable in said cylinder and having a peripheral recess between its ends, passages for the introduction of fluid under pressure into said cylinder selectively at either end of said piston and for discharging fluid from the other end, a source of fluid under pressure, a restricted passage leading from said source to said recess, and a valve controlling the discharge of pressure from said recess to maintain the pressure in said recess substantially equal to that in the discharge end of said cylinder.

3. In combination, a cylinder, a piston slidable in said cylinder and having a peripheral recess between its ends, passages for the introduction of fluid under pressure into said cylinder selectively at either end of said piston and for discharging fluid from the other end, a source of fluid under pressure, a restricted passage leading from said source to said recess, a variable discharge valve subjected on opposite sides to pressure in said recess and from said cylinder at one end of said piston and controlling discharge of fluid under pressure from said recess, and a selector valve subjected on opposite sides to pressure from said cylinder at opposite ends of said piston and selecting the discharge pressure end of said cylinder for connection to one side of said variable discharge valve.

4. In combination, a fluid pressure cylinder, a piston slidable in said cylinder, a piston rod extending from said piston through one end of said cylinder, said piston having a peripheral recess therein between its ends, and a restricted passage leading to said recess from the piston rod face of said piston, said piston rod having a discharge passage therethrough and said cylinder having passages for the admission and discharge of fluid under pressure at opposite faces of said piston, and a variable ported valve in said piston subjected to one side to pressure from said recess and on the other side to pressure from said cylinder at the opposite face of said piston from said restricted passage and controlled by pressure differences on opposite sides to control connection from said recess to said piston rod discharge passage to minimize pressure differences in said recess and in said cylinder at said opposite face of said piston.

5. In combination, a fluid pressure cylinder having pressure supply and discharge passages for opposite ends, a piston slidable in said cylinder and having a peripheral recess between its ends, a piston rod extending from said piston through one end of said cylinder, said piston rod having a pressure supply passage and a discharge passage, said pressure supply passage having a restricted connection to said recess, and a variable flow valve controlling discharge between said recess and piston discharge passage and responsive to differences of pressure between fluid in said recess and at one side of said piston to tend to equalize such pressures by control of rate of discharge from said recess.

6. In combination, a fluid pressure cylinder having pressure supply and discharge passages for opposite ends, a piston slidable in said cylinder and having a peripheral recess between its ends, a piston rod extending from said piston through one end of said cylinder, said piston rod having a pressure supply passage and a discharge passage, said pressure supply passage having a restricted connection to said recess, a variable flow valve controlling discharge between said recess and piston discharge passage and responsive to differences of pressure between fluid in said recess and at one side of said piston to tend to equalize such pressures by control of rate of discharge from said recess, and means responsive to pressure differences in said cylinder at opposite ends of said piston to select the discharge side of said piston to be effective on said variable flow valve.

7. In combination, a fluid pressure cylinder having pressure supply and discharge passages communicating with opposite ends, a piston slidable in said cylinder and having a peripheral recess between its ends, means including a restricted passage supplying fluid under pressure to said recess, a discharge passage leading from said recess outside of said cylinder, a valve controlling discharge from said recess to said recess discharge passage and controlled by pressure from one end portion of said cylinder and in said recess, a selector valve subjected at opposite ends to pressure from opposite end portions of said cylinder, and ports controlled by said selector valve leading to said discharge control valve and causing said cylinder pressure control to be from the discharge end portion of said cylinder.

8. In combination, a fluid pressure cylinder having pressure supply and discharge pasages communicating with opposite ends, a piston slidable in said cylinder and having a peripheral recess between its ends, means including a restricted passage supplying fluid under pressure to said recess, a discharge passage leading from said recess outside of said cylinder, a valve carried within said piston and controlling discharge from said recess to said recess discharge passage, and controlled by pressure in said recess and pressure from an end portion of said cylinder, a selector valve having limited axial motion through said piston and subjected at opposite ends to pressure from opposite end portions of said cylinder, and ports controlled by said selector valve leading to said discharge control valve and causing the end portion of said cylinder effective to control said discharge valve to be selected in accordance with the relative pressures in said end portions.

9. In combination, a fluid pressure cylinder having supply and discharge passages communicating with opposite end portions, a piston slidable in said cylinder and having a peripheral recess between its ends, a piston rod connected to said piston and extending through one end of said cylinder and having a hollow inner end portion, a stationary tube extending into said hollow portion from the opposite end of said cylinder and on which said piston rod is slidable, said piston having a passage connecting said recess with the hollow of said piston and communicating through said hollow with the interior of said tube, a source of fluid under pressure, a restricted passage from said source to said tube, a valve casing, a piston valve slidable in said casing, said valve having a variable discharge port and a free discharge passage from said casing with which said port communicates, one end of said valve casing communicating with said tube for pressure therein to press said valve in a direction to increase the discharge from said tube the opposite end of said casing being open to controlled discharge from said cylinder, and a valve controlling pressure supply and discharge from said cylinder ends to thereby control the direction of motion of said piston.

10. In combination, a fluid pressure cylinder having supply and discharge passages communicating with opposite end portions, a piston slidable in said cylinder and having a peripheral recess between its ends, a piston rod connected to said piston and extending through one end of said cylinder and having a hollow inner end portion, a stationary tube extending into said hollow portion from the opposite end of said cylinder and on which said piston rod is slidable, said piston having a passage connecting said recess with the hollow of said piston and communicating through said hollow with the interior of said tube, a source of fluid under pressure, a restricted passage from said source to said tube, a valve casing, a piston valve slidable in said casing, said valve having a variable discharge port and a free discharge passage from said casing with which said port communicates, one end of said valve casing communicating with said tube for pressure therein to press said valve in a direction to increase the discharge from said tube, a piston selector valve subjected at opposite ends to pressure from opposite end portions of said cylinder and movable by differences of such pressure to selectively connect one or the other end of said cylinder to the opposite end of said casing, and a valve controlling pressure supply and discharge from said cylinder ends to thereby control the direction of motion of said piston.

11. In combination, a fluid pressure cylinder having supply and discharge passages communicating with opposite end portions, a piston slidable in said cylinder and having a peripheral recess between its ends, a piston rod connected to said piston and extending through one end of said cylinder and having a hollow inner end portion, a stationary tube extending into said hollow portion from the opposite end of said cylinder and on which said piston rod is slidable, said piston having a passage connecting said recess with the hollow of said piston and communicating through said hollow with the interior of said tube, a source of fluid under pressure, a restricted passage from said source to said tube, a valve casing, a piston valve slidable in said casing, said valve having a variable discharge port and a free discharge passage from said casing with which said port communicates, one end of said valve casing communicating with said tube for pressure therein to press said valve in a direction to increase the discharge from said tube, a piston selector valve subjected at opposite ends to pressure from opposite end portions of said cylinder and movable by differences of such pressure to connect the cylinder end from which discharge is taking place to the other end of said valve casing, and a valve controlling pressure supply and discharge from said cylinder ends to thereby control the direction of motion of said piston.

12. In combination, a cylinder, a piston slidable in said cylinder, said piston and cylinder having between them an annular chamber around said piston and between its ends, passages for the introduction of fluid under pressure into said cylinder selectively at either end of said piston and for discharging fluid from the other end, a source of fluid under pressure, a restricted passage between said source and said annular chamber, a variable discharge valve subjected on opposite sides to pressure in said annular chamber and from said cylinder at one end of said piston and controlling discharge of fluid under pressure from said annular chamber, and means selecting the discharge pressure end of said cylinder for connection to one side of said discharge valve.

13. In combination, a cylinder, a piston slidable in said cylinder, said piston and cylinder having between them an annular chamber around said piston and between its ends, passages for the introduction of fluid under pressure into said cylinder selectively at either end of said piston and for discharging fluid from the other end, a source of fluid under pressure, a restricted passage between said source and said annular chamber, a variable discharge valve subjected on opposite sides to pressure in said annular chamber and from said cylinder at one end of said piston and controlling discharge of fluid under pressure from said annular chamber, and a selector valve subjected to pressure from said cylinder at opposite ends of said piston and automatically selecting by pressure differences at opposite ends of said piston the discharge pressure end of said cylinder for connection to one side of said variable discharge valve.

GERARD A. CORMIER.

REFERENCES CITED

The following references are of record in the file of this patent:

UNITED STATES PATENTS

| Number | Name | Date |
|---|---|---|
| 2,153,774 | Poitras | Apr. 11, 1939 |
| 2,367,009 | Davis | Jan. 9, 1945 |